July 2, 1963 W. A. MORRISON 3,095,969

CONTAINER AND REEL FOR TAPES

Filed Aug. 1, 1961 2 Sheets-Sheet 1

INVENTOR
William A. Morrison

BY Emery Whittemore Sandoe & Graham
ATTORNEYS

July 2, 1963 W. A. MORRISON 3,095,969

CONTAINER AND REEL FOR TAPES

Filed Aug. 1, 1961 2 Sheets-Sheet 2

INVENTOR

William A. Morrison

BY Emery Whittemore Sandoe & Graham

ATTORNEYS

United States Patent Office 3,095,969 Patented July 2, 1963

3,095,969
CONTAINER AND REEL FOR TAPES
William A. Morrison, Ridgefield, Conn., assignor to Reeves Soundcraft Corp., Danbury, Conn.
Filed Aug. 1, 1961, Ser. No. 128,534
1 Claim. (Cl. 206—53)

This invention relates to a container for magnetic tapes and the like in which an improved reel is utilized to form the container in combination with a removable peripheral cover.

Conventional tape reels, such as those employed for transport and storage of the magnetic tapes used with computors, are provided with a central annular spool and flanges having perforations therein. It has been conventional to construct the flanges with such perforations to allow access to the interior of the reel and to allow for the escape of air during reeling.

However, to protect the magnetic tape against contamination by dust during periods of storage, the entire reel must be enclosed within a sealed container. Such storage is essential for computor tapes. In such tapes, the information is usually stored in the form of bits. Dirt particles on the tape will cause deflection of the tape from the read-out head, which often results in the generation of an erroneous output signal.

The storage containers are effective but are expensive and bulky. To provide a dust-proof enclosure, gasket seals are usually employed and means are provided to urge the cover members into contact with the seals on closing. The cost of such construction is necessarily quite high. Further, the container adds bulk to the stored reels, increasing the problems of storage space.

It is, therefore, the object of this invention to provide a container in which an improved reel is used to form the container in combination with a removable peripheral cover.

It is a further object of this invention to provide a container which occupies approximately the same space as a conventional reel alone and which container may be nested upon other like containers.

It is a further object of this invention to provide a deflectable annular cover to encase the flanges of a reel in a dust-proof engagement.

It is a further object of this invention to provide a peripheral cover to enclose a reel on which tape is stored which is provided with means to prevent the tape on the reel from unraveling.

In accordance with these objects, there is provided, in a preferred embodiment of this invention, a reel to receive tape, such as magnetic tape. The reel comprises a central cylindrical spool to the ends of which are affixed annular flanges of solid construction. The flanges may be constructed of clear plastic if it is desired that the tape stored on the spool be visible for inspection. However, irrespective of the material used, the flanges are solid to eliminate openings through which dirt and dust may enter. The spool may be provided with a tape clamp to start the tape on the reel.

A dust-proof cover is provided. The dust-proof cover comprises an annular deflectable split ring. The cover may, for example, be constructed of a deflectable plastic having the requisite physical properties to resist deformation during deflection, such as polypropylene. The cover is split at one location so that it may be deflected by hand and adjusted to encircle the reel. The cover may then be locked in position by a locking tab so that the cover securely encloses the reel in a dust-tight seal.

The cover consists of parallel U-shaped channels supported by and integrally formed with an intermediate web. The web is dimensioned to fit between the flanges of the reel thereby to protect the flanges against deformation thereof during storage which deformation might result in tape damage. Each of the channels is dimensioned to engage a respective flange of the reel to provide a dust-tight enclosure. The locking table is provided with means to seal the portion of the cover to prevent entry of dust therethrough.

To enable stacking of the containers formed by the reel and the encircling cover, there is provided an upwardly extending shoulder at the end of the channel member on the exterior of one surface of the cover. This shoulder will coact with the other channel member of another reel to enable stacking of the reels.

The cover is preferably provided with a flexible finger extending inwardly from the flange of the cover. The finger may be integrally formed with the cover, or be attached to it, and be of such length as to engage the outside layer of the tape on the reel to prevent unraveling thereof.

This invention will be more clearly understood by reference to the following description taken in combination with the accompanying drawings, of which:

Figure 1:
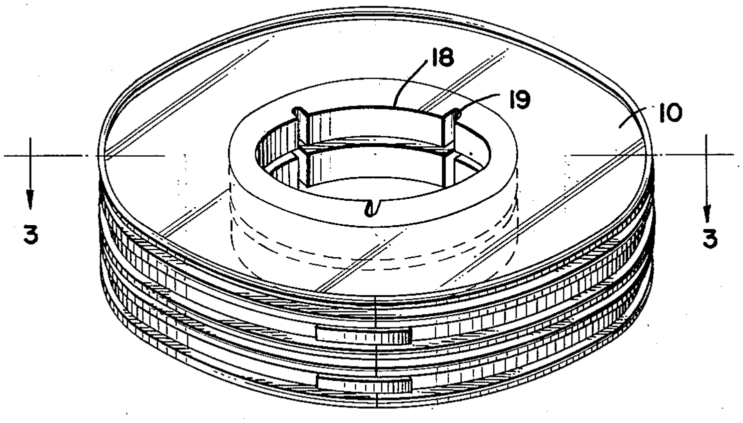
FIG. 1 is a perspective view of containers in accordance with this invention stacked for storage.

Referring to the fingers, there is shown a reel 10 for the storage of recording media, such as magnetic tape 11, upon which information can be recorded in conventional form. For example, the tape may be a magnetic tape carrying digital information in the form of recorded bits.

The reel comprises a central cylindrical spool 12 to the ends of which are affixed radially extending overlying flanges 14 and 16. Contrary to conventional practice, the flanges are not perforated but are solid to isolate the tape 11 from airborne dust and contamination. The reel is provided with the usual spindle aperture 18 for mounting of the reel on the spindle of the equipment with which used. Indexing notches 19 may be provided to coact with the drive dowels on the spindle. The reel is conveniently made from mating molded plastic sections as illustrated which then may be bonded together along the boundary 21 of the meshed sections. When it is desirable to view the contents on the reel, it can be fabricated of a transparent plastic, such as transparent polystyrene.

The dust-proof cover 20 consists of easily deformable annular band of plastic which is split at 22. The cover consists of a first channel 24 and a second channel 26 separated by and integrally formed with a central web 28.

The channel 24 is dimensioned to enclose the edge of the flange 14 in a dust-proof arrangement. Similarly, channel 26 is dimensioned to enclose the edge of flange 16. The central web 28 completes the dust-proof enclosure of the reel. In addition to supporting the channels at the desired separation, the web 28 serves to protect the real flange against deformation during storage. The web enters between the flanges and supportably engages the outer edges of the flanges to prevent deformation of the flanges, which deformation might damage the tape 11.

The container is formed from the reel and the annular cover 20 by deforming the split cover and installing the cover on the periphery of the reel. A latch 30 is provided to lock the cover in the closed position. To ensure that the cover is dust tight at the latch, I prefer to provide a tongue 32 which mates in the grooves 34 in sealing engagement. The latch merely snaps over the shoulder 36 to lock the cover in the closed position.

Figure 2:
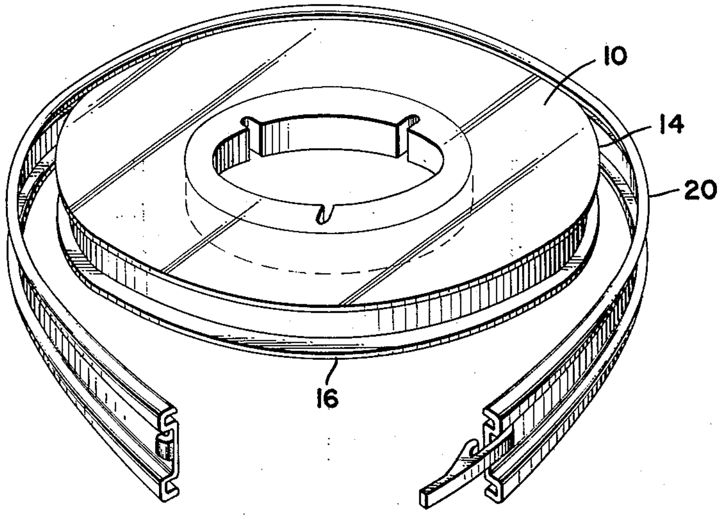
FIG. 2 is a diagrammatic view of one of the containers shown in FIG. 1 useful for explanation of the removal of the annular cover.

In operation the dust cover may be simply removed by flipping up the latch and deforming the cover sufficiently to allow installation on and removal of the cover from the reel, as is illustrated in FIG. 2. The material from which the cover is formed must, of course, have the requisite physical properties to maintain its desired shape despite the repeated deformation thereof over the desired life. I have found that covers made of polyproylene are admirably suited to such application due to the unusually high resistance of polypropylene to failure under the bending stresses. The latch assembly may thus be integrally formed without hinges, the polypropylene itself providing the necessary resistance to failure under repeated flexing.

Figure 3:
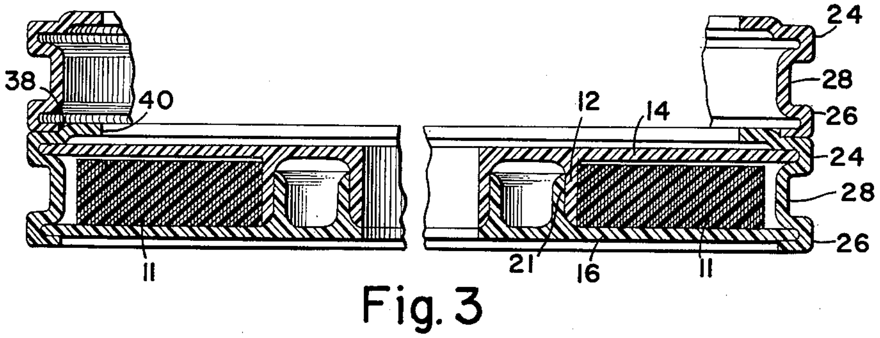
FIG. 3 is a cross sectional view taken along lines 3—3 of FIG. 1.
Figure 4:
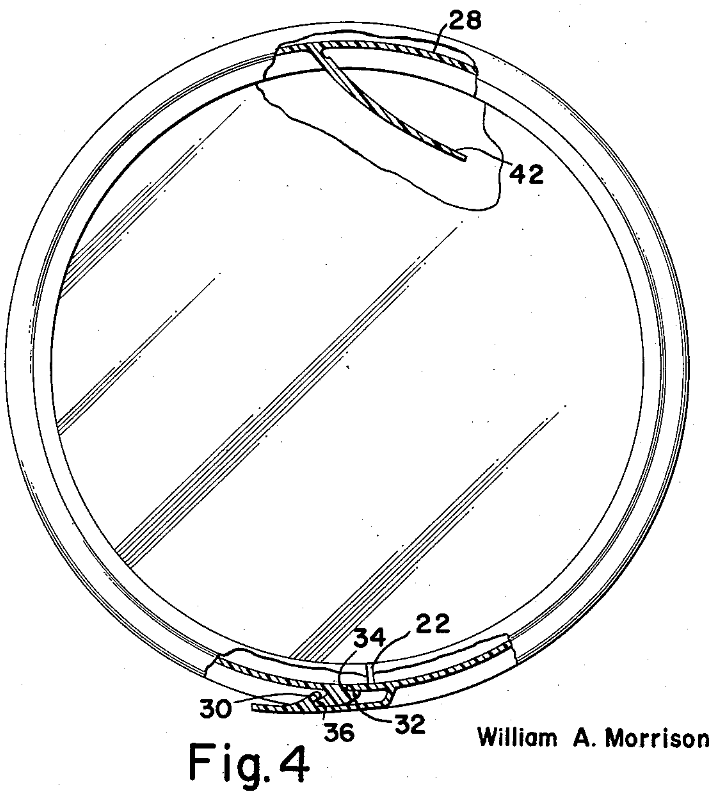
FIG. 4 is a partially sectioned plan view of the container shown in FIG. 1.

To enable stacking of a plurality of reels, the flange 26 is provided with a vertically disposed shoulder 38 which may have a radially extending annular portion 40 for added strength if such strength is required. The upstanding shoulder nests within the channel member 26 of an adjacent reel as shown in FIGS. 1 and 3 to allow stacking of a plurality of reels in a relatively small space.

Thus, in addition to advantages of economy of fabrication and ease of use, the storage space requirements for the container according to the present invention is significantly less than the space utilized by the reels and containers known to the art. For example, about 20% reduction in vertical space is effected by a utilization of the present invention.

To prevent loosening or unwinding of the tape during storage, there is provided a flexible finger 42 extending inwardly from the web 28 of the cover, to which one end of the finger is affixed. The finger is preferably formed integrally with the cover; but may be affixed with a separate operation, such as riveting. The finger will engage the outer layer of the tape 11 to hold the tape in the desider tightly coiled condition and to prevent loosening of the tape. Thus, the cover may be installed directly on the reel to form the storage container simultaneously holding the tape in place. Thus, the need for wedges, hold down tabs, end of tape garters, and the like is unnecessary. Of course, in those applications where the finger cannot be employed, it is not provided during molding of the cover.

Thus, there is provided a simple and efficient container using an improved reel having solid flanges to form the container in combination with an annular, deformable dust cover. The dust cover may be installed and removed simply. The cover provides a tape holding means and stacking means. To use the tape, the cover need merely be removed and the reel installed in the utilizing equipment. The container is thus far more economical than conventional containers.

This invention may be variously embodied and modified within the scope of the subjoined claim.

What is claimed is:

A dust-free storage container comprising a reel, said reel being formed from mating halves of a molded plastic material, said reel having a cylindrical, centrally located spool and radially extending solid flanges affixed to each end of the spool, and an annular cover for said reel, said annular cover and said solid flanges coacting to provide a dust-free storage container, said cover comprising a C-shaped molded plastic cover, the ends of which are self-biased into engagement to provide an annular cover for said reel, said cover comprising a first and second channel, a web between said first and second channel, each of said channels dimensioned to receive a respective flange of said reel in a dust-tight enclosure, said web dimensioned for insertion between the flanges of said reel to supportably engage said flanges, said cover being installed on said reel by deforming said C-shaped assembly to encircle said reel, and latch means extending between the ends of said cover to lock said cover in a dust-sealing relationship thereto, said first channel member being provided with upstanding annular shoulder inwardly of the channel and along the outer free edge of said first channel member, said said channel member terminating in a free edge concentric with said shoulder, whereby said shoulder is positioned to coact with the second channel member of an adjacent container in nesting relationship so that a plurality of reels may be nested for compact storage, and a flexible inwardly extending finger integrally molded to the web of said cover to engage magnetic tape secured on said reel.

References Cited in the file of this patent

UNITED STATES PATENTS

| | | |
|---|---|---|
| 2,146,719 | Chaplin et al. | Feb. 14, 1939 |
| 2,191,849 | Debrie | Feb. 27, 1940 |
| 2,330,278 | Gordon | Sept. 28, 1943 |
| 2,768,740 | Cranwill | Oct. 30, 1956 |
| 2,822,919 | Kulka | Feb. 11, 1958 |
| 2,842,262 | Wismer | July 8, 1958 |
| 2,859,868 | Jaworski | Nov. 11, 1958 |

FOREIGN PATENTS

| | | |
|---|---|---|
| 1,221,771 | France | Jan. 18, 1960 |